June 14, 1960 H. NYGAARD 2,940,753

ENDLESS LOOP MAGNETIC TAPE CARTRIDGE AND MAGAZINE

Filed Aug. 4, 1948

3 Sheets-Sheet 1

INVENTOR
Herman Nygaard
BY Pennie, Edmonds, Morton & Barrows
ATTORNEYS

ENDLESS LOOP MAGNETIC TAPE CARTRIDGE AND MAGAZINE
Filed Aug. 4, 1948
3 Sheets-Sheet 2
Fig. 3,
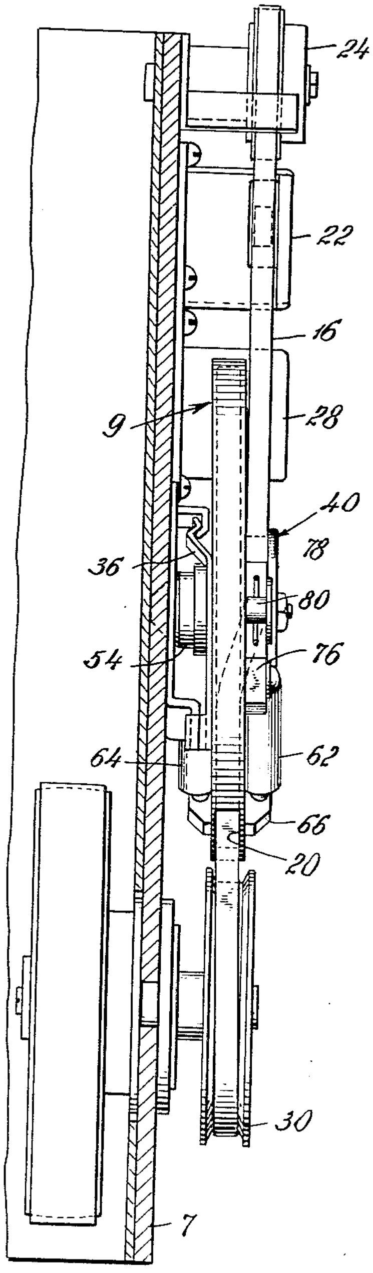
Fig. 5,
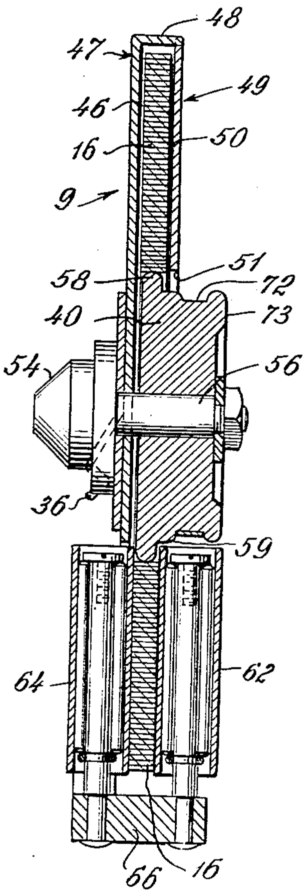
Fig. 6,
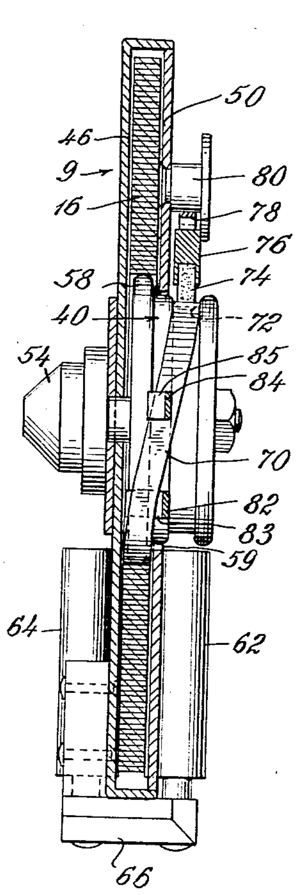
INVENTOR
Herman Nygaard
BY
Pennie, Edmonds, Morton & Barrows
ATTORNEYS June 14, 1960 H. NYGAARD 2,940,753

ENDLESS LOOP MAGNETIC TAPE CARTRIDGE AND MAGAZINE

Filed Aug. 4, 1948 3 Sheets-Sheet 3

INVENTOR
Herman Nygaard
BY
Pennie, Edmonds, Morton & Barrows
ATTORNEYS

United States Patent Office 2,940,753

Patented June 14, 1960

2,940,753

ENDLESS LOOP MAGNETIC TAPE CARTRIDGE AND MAGAZINE

Herman Nygaard, Poughkeepsie, N.Y., assignor, by mesne assignments, to Daystrom Incorporated, Murray Hill, N.J., a corporation of New Jersey Filed Aug. 4, 1948, Ser. No. 42,415

12 Claims. (Cl. 242—55.19)

This invention relates to the field of magnetic sound recording, and particularly to the recording of sounds on magnetizable tapes formed into endless closed loops.

The present invention provides a magazine adapted to contain an endless magnetizable tape in flat spirally coiled form except for a loop portion external to the magazine which joins the inner and outer coils or turns of the spiral. Such a magazine permits the storage of a very considerable length of tape in a compact space. Loaded magazines or cartridges of metallic tape according to the present invention are particularly distinguished for their ability to provide dependable trouble-free recording service over uninterrupted periods of weeks and months, the tape being continuously withdrawn from the magazine at the center of the spiral and advanced past playback and recording heads for return to the magazine at the outside thereof. Such magazines may also find application outside the field of magnetic recording, wherever it is desired to advance an endless length of tape continuously past a given point.

In its application to magnetic recording the magazine of the present invention has for the first time, so far as is known to applicant, made it possible to hold a recording system in a state of readiness over an indefinite period of time without the need for change and wastage of the record medium which is exposed to the recording equipment before the appearance of the signal or signals to be recorded. By means of the present invention a length of magnetic recording tape may be compactly contained and kept for months on end in continuous motion past recording and playback heads in associated equipment, in instantaneous readiness to receive and register any signal fed to the equipment.

Prior efforts to provide recording equipment with the long operating life demanded for such service have failed for lack of means to support the loop of tape properly with a minimum of wear and flexure of the tape. Prior devices have provided service lives of hours or days, instead of the months of continuous operation which are routine with the equipment of the present invention.

There has existed a need for a recording system capable of being maintained for indefinite periods of time in a state of complete readiness and sensitivity, able without human intervention of any sort to record radio or audible signals having an unpredictable time of arrival. In military operations for example, instructions may be passed at the discretion of the officer in charge to all units under his control by audible or radio means. It is desirable in such circumstances to make possible the recording of such signals as they arrive and their reproduction at shortly subsequent times, in the event that the instruction when first passed is not clearly understood or remembered by the addressee.

A magnetic recording system employing a record medium in endless loop form provides a solution to this problem. With a magnetic recorder whose input is permanently connected to the source of signals, by means of a microphone in case the signals are audibly received, or by connection to the output of suitable radio receiving apparatus in the case of radio signals, a magnetic recording medium in the form of an endless closed loop may be continuously advanced past the sound recording head in the recorder. A playback head may be arranged to contact the material of the loop at another point in the path of the loop travel, for example immediately prior to the location of the recording head. Incoming signals are then recorded on the tape, regardless of their time of arrival, and played back when the record-bearing portion of the tape reaches the playback head. The tape may then be exposed to an erasing head before arriving again at the recording head, so as to be ready for new signals. Within the length of recording time provided by the length of loop employed, any signal on the incoming channel will be recorded. If the addressee of the message fails to hear it as directly transmitted, he may, with equipment of the type presently to be described, hear the message played back with a delay determined by the length of recording time provided by the length of loop in use.

Although the use of a record medium in the form of a closed loop answers the primary requirement of permitting repetitive use of the same record medium, a loop of the length required to provide a worthwhile length of recording time is difficult to dispose compactly except in spiralled form. Moreover, in equipment intended for continuous operation over long periods of time the closed loops are preferably made of metal, and flexure of the metal tape, especially in reverse directions, is to be avoided. A spiral disposition of the loop of tape is therefore especially advantageous.

A spiral of metallic tape however, especially if made of such a grade and temper of stainless steel as is desirable for long operating life, possesses such resiliency and elasticity that it is practically unmanageable without special facilities and must be confined within an essentially closed magazine. If once the spiral of tape is freed from the magazine, the coils thereof expand to such an extent as to make it difficult to return the tape to its proper shape. When the tape is formed into an endless loop any change in the number of coils or turns in the spiral introduces a corresponding number of half-twists in the external loop which joins the inner and outer turns of the spiral. These difficulties in handling the tape, especially by untrained personnel without special facilities, dictate that the magazine must be loaded with a properly coiled spiral of tape under factory conditions so that the number of turns in the spiral may not be changed in the field.

The spiral form, while especially advantageous for compactness as above pointed out, presents formidable problems from the standpoints of avoiding jamming and wear of the tape over long periods of use. The magazine of the present invention is particularly designed to solve these problems.

The magazine of the present invention and cartridges of tape employing the same, both in the details of their construction and with regard to their advantages in connection with related magnetic recording equipment, will now be described by reference to the following drawings in which:

Fig. 3 is a partial sectional view of the recording and reproducing unit of Fig. 2 taken along line 3—3;

Fig. 5 is a sectional view taken along the line 5—5 of Fig. 4;

Fig. 6 is a sectional view taken along the line 6—6 of Fig. 4; and

Figures 1, 2, 4:
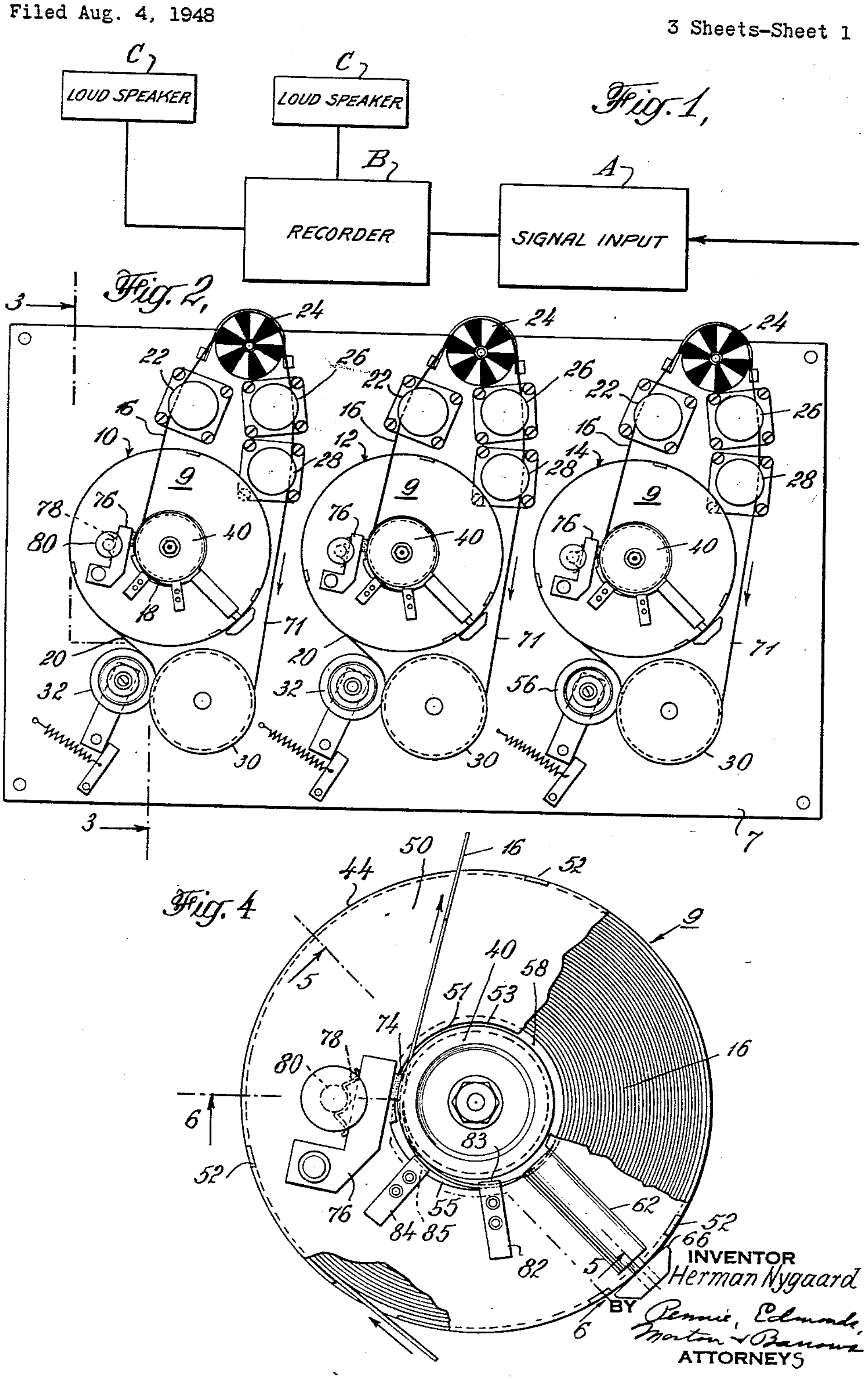
Fig. 1 is a block diagram of a recording and reproducing system employing one or more magazines of the present type.
Fig. 2 is a front elevation of a recording and reproducing unit adapted to use in the system of Fig. 1 and employing three magazines containing progressively increasing lengths of record tape.
Fig. 4 is a plan view of one of the magazines shown in Fig. 2 with the cover thereof broken away to show the record tape within.

In Fig. 1, A represents a microphone, or the audio output portion of a radio receiver, or it may represent a speech amplifying unit in a voice intercommunication or telephone system. In any case it supplies alternating current signals in the audio or supersonic frequency range within the recording capacity of a magnetic recorder to a recording and reproducing unit B (hereinafter referred to simply as a recorder). The recorder B contains one or more recording units employing as record medium an endless closed loop of magnetizable tape. Each unit includes a cartridge of tape record medium according to the present invention composed of an endless loop of tape coiled and enclosed into a magazine of the present invention to form a unitary structure. It is sometimes advantageous to provide more than one recording unit, each unit operating with a tape of different length so as to provide different recording capacities and different delay times between recording and playback. The recording units are connected in parallel to the input signal so that any arriving signal is simultaneously recorded on all recording tapes, and successively played back by the several recording units according to their lengths of tape.

Reproducing devices C, for example loud speakers, are connected to the playback heads through suitable amplifying equipment and are located at points convenient to the listener so that he may, if he fails to hear the message as originally received, hear it played back by any one of the recording units. A selector switch provided at the reproducing units C permits the listener to select for playback whichever recording unit gives the delay period desired before repeating back the message.

Fig. 2 shows a front elevation of a recorder such as is represented as the unit B in Fig. 1, and which employs the magazine and tape cartridge of the present invention. The recorder of Fig. 2 includes a front panel 7 to which are removably attached three separate recording cartridges generally indicated at 10, 12 and 14, each of which includes a magazine 9 and a recording tape 16. The front panel also supports the sound recording, reproducing and erasing heads cooperating with the recording tapes contained in the magazines 9, and the driving pulleys and associated apparatus. The three recording cartridges shown may be identical except for the length of recording tape in each. Referring to the cartridge 10, a recording tape 16 is seen emerging from the magazine 9 through a central aperture 18 and returning at the periphery of the magazine through an aperture 20. The emerging tape passes over a playback head 22, an idler pulley 24, erasing head 26, and recording head 28. Thence it passes over a driving pulley 30 and a pressure pulley 32 and back into the magazine. The necessary amplifying equipment for recording and playback, and the driving mechanism are mounted behind the front panel 7.

The front panel 7 also permits proper spacing and orientation of the various elements over which the tape passes with respect to the magazine, as shown in Fig. 3.

The magazine, shown in more detail in Figs. 4–6, provides enclosure to the spiral of recording tape 16 by means of a substantially closed box or container generally indicated at 44. The magazine may advantageously conform approximately to a shallow right circular cylinder bounded by front and back end faces or plates 46 and 50 which form parallel right sections of the cylinder separated by an altitude which is small compared to the diameter of the cylinder. The box or container may be conveniently made up of sheet metal stampings, a rear stamping 47 providing the back end face or plate 46 and a shallow cylindrical side wall 48, and a front stamping 49 providing the front end face or plate 50.

It is not essential of course that the side wall 48 conform to a circular cylinder. Any other surface properly enclosing the space between the end faces may be used. Indeed it will suffice to provide a number of pins or pillars disposed about the periphery of the end faces in order to hold them in the proper spaced relation and to confine the spiral of tape between the end faces. It will usually be most convenient however to make this side wall conform to a cylinder in the general sense of the word, i.e. a surface generated by straight line elements moving parallel to a fixed straight line. Preferably the fixed straight line will be perpendicular to the end faces so that the end faces will be right sections of the cylinder which forms the side wall, whatever its shape. The end faces will then be perpendicular to the elements of the side wall. As closed side wall has the advantage of providing substantial protection to the tape against the accumulation of dust and dirt, whose collection on the tape tends seriously to shorten the operating life of the cartridge.

Whether the side wall 48 is cylindrical or not and whether a complete side wall is provided or not, the magazine is advantageously characterized by parallel plane front and back end faces or end plates 46 and 50 which are separated by a distance adapted to accommodate the width dimension of the tape with a small amount of play. The end faces may of course be apertured to any extent desired.

In manufacture the magazine is preferably permanently assembled together with the recording tape 16 inside, to form a loaded magazine or tape cartridge, the stampings 47 and 49 being fastened together by suitable means such as detents 52 around the circumference.

A boss 54 projects coaxially from the rear end face 46 of the magazine (Fig. 3) and a surrounding bayonet fitting 36 serves in conjunction with the boss to mount the magazine correctly in relation to the associated equipment of the recorder on front panel 7 thereof.

Within the magazine the continuously moving coil or spiral of tape 16 rides upon a central roller or wheel 40 mounted for rotation about an axis perpendicular to the front and back end faces 46 and 50 of the magazine. In the circularly cylindrical magazine of Fig. 4 the roller is mounted coaxially with the cylindrical volume defined by the magazine. As seen in Fig. 5 the roller 40 is mounted for rotation on an axle 56 projecting from the boss 54. The central roller may of course also be mounted for rotation as a ring about a plurality of bearing elements in a circle, much as the outer race of a ball or roller bearing rotates about the inner race.

For the support of the tape within the magazine the central roller includes a flange 58 of greatest diameter, and the tape rides within the magazine on the flange 58, except for a cross-over portion 70 which leads the tape out of the magazine and an external loop 71 which leads past the associated elements of the recorder and back into the magazine at the periphery thereof.

In view of the continuous service to which the cartridge is adapted to be subjected, it is desirable to avoid the necessity for periodic lubrication of the moving parts thereof—the tape itself and the rollers on which it rides. This is particularly true since oil coming into contact with the recording tape has a tendency to cause sticking between adjacent coils or turns of the spiral, and ultimate jamming of the cartridge. The central roller 40 may therefore advantageously be made of a self-lubricating material. Rollers made from compounds of carbon and graphite powders compacted under high temperatures and pressures have proven satisfactory. A material of this type is sold under the trade-name of "Graphitar." A central roller made of such material not only lubricates itself in rotation about its axle but provides the necessary minimum of lubrication to the coils of the tape. A small amount of wax may also be applied to the tape but with a central roller of graphite-bearing material it has been found to be unnecessary.

The front end face 50 has, as seen in Figs. 4 and 5, a central aperture 51. The aperture 51 may be bounded by arcs 53 and 55 of circles coaxial with the roller 40 and hence coaxial with the cylinder to which the magazine of Fig. 4 conforms. The arc 53 is advantageously formed from a circle of diameter slightly smaller than that of the flange 58, whereas the arc 55 is advantageously formed of a circle of diameter at least as great as that of the flange 58.

In order to maintain the coils of tape within the magazine so that there will be clearance between the coils and the end walls, two guiding rollers 62 and 64 are advantageously provided as shown in Fig. 5. The rollers 62 and 64 extend from the periphery of the magazine to a radial position preferably inside the periphery of the flange 58, one on either side thereof. They may advantageously extend radially outward from the axis of rotation of the central roller, although this is not necessary. The rollers 62 and 64 are so positioned along the axis of the magazine as defined by the axis of rotation of the roller 40 as to provide between themselves a space slightly greater than the width of the record tape, located inside the magazine between the front and back end faces 46 and 50 thereof. The rollers 62 and 64, which may be mounted on needle bearings, are supported from a journal block 66 affixed to the rear end face 46. The guiding rollers 62 and 64 retard the tendency of the coils to displace themselves axially of the magazine with respect to each other with resulting excessive friction on the end faces of the magazine and binding.

With the use of a self-lubricating central roller 40 and of guiding rollers 62 and 64, lubrication of the tape, the separate coils or turns of which must slip with respect to each other in passing from the outermost to the innermost coil of the spiral, is ordinarily unnecessary. The magazine may be permanently assembled with a length of tape enclosed proportioned to the desired length of recording time in view of the intended tape speed. Speeds of approximately two, three, and six feet per second have been successfully employed.

The cross-over portion 70 and the external loop 71 of the recording tape lead from the center of the magazine, where the tape contacts the central roller 40, out of the magazine and thence over the recording heads and driving apparatus of the recording unit and back into the magazine as follows: The central roller 40 includes, exterior to the space enclosed by the end faces of the magazine, a hub 73 having a groove 72 of a width appropriate to the tape and of a diameter smaller than that of the flange 58. A pressure element, which may take the form of a friction shoe 74, is arranged to bear in this groove against the cross-over portion 70 of the tape at a position circumferentially displaced a fraction of a turn past the position of the guiding rollers 62 and 64 in the sense of the tape travel. This pressure element serves to press the tape against the groove of the central roller, providing enough friction to prevent slippage at this point between the tape and the central roller. The friction shoe may advantageously be made of a self-lubricating graphitic material similar to that of which the central roller itself is formed. It is supported adjacent the end of a lever 76 which is resiliently stressed against the central roller by means of a light spring 78 compressed between the lever and a stop pin 80. In addition to driving the groove of the central roller at the linear speed of the tape, a pressure element in the form of a friction shoe provides by its own slippage over the tape a drag which keeps the tape under tension in passing over the playback and recording heads.

Between the peripheral positions of the guiding rollers and the pressure element, the cross-over portion 70 of tape is led axially of the central roller from the position of the flange 58 to the position of the groove 72, as shown in Fig. 6. On the central roller a zone of decreasing diameter, which may be in the form of a shoulder 59, facilitates a smooth transfer of the tape from the flange 58 to the groove 72.

The magazine is preferably operated in an approximately upright position, i.e. with the axis of rotation of the central roller 40 horizontal. The tape emerging from the magazine between the friction shoe 74 and the groove 72 of the central roller at approximately mid-height on the roller (see Fig. 2) is drawn by the driving pulley of the associated recording equipment over the associated recording and playback heads. The continuous tension exerted on the tape as it leaves the magazine, and the friction between the tape and the groove 72 of the central roller produced by friction shoe 74, keeps the central roller in rotation at an angular velocity corresponding to the linear velocity imposed upon the cross-over portion 70 of the tape by the driving pulley and the diameter of the groove 72. The periphery of the flange 58 accordingly possesses a slightly greater linear velocity than the groove 72.

Accordingly any friction between the inside turn of the spiral and the flange 58 (such as may result from the inside turn tending to rest on the top of flange 58 when the magazine is in a vertical position) tends to advance the tape slightly faster than it is withdrawn at the friction shoe 74. This provides on the lower side of the roller a slight loop of tape spread to follow an arc of slightly greater radius than that of the roller, so that over this arc the tape is suspended free of contact with the roller 40 and may move axially thereof from the position of the flange 58 to that of the groove 72. The tape so suspended, i.e. the cross-over portion 70, is moved axially of the roller by a distortion essentially transverse to the width of the tape, and the free suspension of this cross-over portion between the guiding rollers 62, 64 and the friction shoe 74 permits the tape to twist for this purpose with a minimum of stress which promotes long operating life for the cartridge.

Although as stated above the magazine is preferably operated in an upright position with the axis of the central roller in an approximately horizontal position, the two-diameter construction of the central roller 40 effects a similar facilitation of the extraction of the tape from the magazine with a minimum of stress, whatever the orientation of the magazine during operation. If the magazine is horizontal, for example, although no gravitational force brings the innermost coil of tape within the magazine to bear on the flange 58, as gravity tends to do when the magazine is upright, the continuous withdrawal of tape past the pressure element bearing in the groove 72 tends to constrict the innermost coil of tape into contact with the flange 58. The peripheral velocity of the flange 58 being higher than the speed of the tape, contact between the flange and the tape tends to advance the tape between its point of contact with the flange 58 and the point of withdrawal under the pressure element so as to decrease friction between the tape and central roller and to tend to produce a length of tape out of contact with the roller. Axial motion of the tape is therefore facilitated as before.

These relationships are illustrated particularly in Fig. 6 in which may be seen the axial transfer of the tape from inside the magazine between the rollers 62 and 64 to outside the magazine, where it rides in the groove 72. The balance automatically established between the fixed rate of withdrawal of tape past the friction shoe 74 and the supply of tape from the innermost coil of the spiral of the magazine may also be seen in Fig. 4.

To assist in maintaining a proper path of travel of the tape as it leaves the magazine, guides or tabs are advantageously provided over the exit arc 55 of the aperture 51 (Fig. 4) between the guiding rollers 62 and 64 and the position of the friction shoe 74. These tabs are of particular assistance during the transient condition when the tape is set in motion after a shut down, when the magazine is operated in a horizontal position, and after a cartridge has been in use for a long period. A tab 82 located at a small angular distance in the sense of the tape travel past the position of the guiding rollers 62 and 64 may be fastened to the front end face 50 so as to provide a bent portion 83 (Fig. 6) at right angles to the face 50, extending parallel with the axis of the central roller and hence parallel to the width of the tape. The bent portion 83, which provides the guidance to the tape, is located radially a short distance outward from the flange 58 of the central roller. The innermost turn of the spiral after passing between the guiding rollers 62 and 64 is looped radially outside the bent portion 83 of the tab 82 at the start of its axial travel from the position of the flange 58 to that of the groove 72. The tab 82 maintains the cross-over portion 70 of the tape radially out of contact with the central roller over the arc between the rollers 62 and 64 and the point of contact with the shoe 74 when the tape is set into motion, thus preventing excessive strain of the tape in its axial progression from the flange 58 to the groove 72. A second tab 84 spaced farther around the arc separating the guiding rollers 62 and 64 from the friction shoe 74 may be provided with a similar operative bent portion 85 extending parallel with the axis of the central roller. The bent portion 85 however is located at a radial distance from the central roller which permits the cross-over portion 70 of the tape to pass radially inside thereof. The growth of excessive slack in the cross-over portion is thereby retarded. The cross-over portion 70 of the tape extending between the guiding rollers and the pressure element is thus held within radial limits which restrain it from contact both with the central roller and with the next outer coil of the tape. A smooth and uniform axial transfer of the tape is thus further facilitated.

When the tape is clean and free from dust or foreign matter, as for example at the start of a run with a fresh cartridge, the cross-over portion may hang clear of the tabs 82 and 84 once the tape is running smoothly. However as dust accumulates on the tape and within the magazine the tape may show some tendency to stick, and the cross-over portion 70 will tend to ride closer to the central roller. Under these conditions the tab 82 is of especial assistance in facilitating axial transfer of the cross-over portion 70 of the tape.

Figure 7:
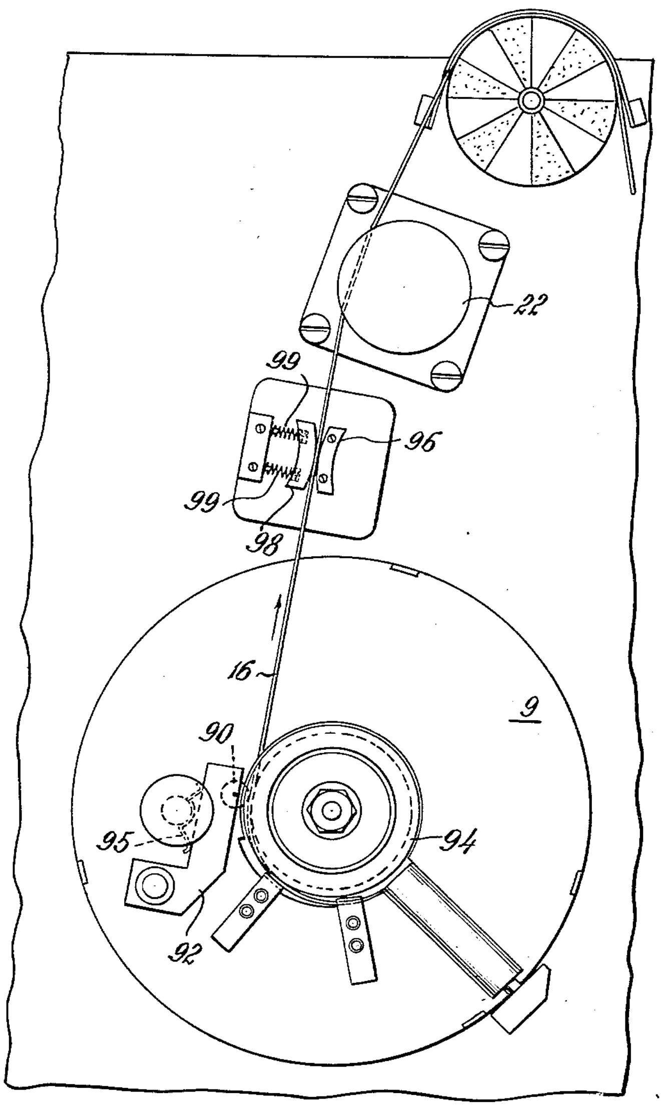
Fig. 7 shows a modified form of magazine mounted on the front panel of a suitable recording and reproducing unit.

In place of the friction shoe 74 shown in Fig. 4 which provides a sliding frictional drag on the tape as well as pressing the tape against the central roller, the pressure element may take the form of a small roller. A modified form of magazine employing such a friction roller is shown in Fig. 7. In Fig. 7 a roller 90 is shown mounted for rotation about its own axis adjacent the end of a lever 92 pivotally mounted on the front face of the magazine, which may in other respects be similar to the magazine of Fig. 4. The friction roller 90 is resiliently stressed against the tape 16 as it rides in the groove of the central roller 94 by an appropriately disposed spring 95. Although the contact between the friction roller 90 and the tape is a rolling instead of a sliding one, the resulting pressure between the tape and the central roller 94 produces friction between these two elements which insures as in the embodiment of Fig. 4 that the peripheral speed of the central roller will be equal to the linear speed of the tape as it is extracted between the central roller 94 and the friction roller 90. The friction roller 90 may advantageously be made of a self-lubricating material similar to that employed in the central roller or it may be made of a suitable metal such as brass, for example.

When the frictional contact between the tape and the central roller is provided by a friction roller such as the roller 90 of Fig. 7 instead of a sliding shoe such as the shoe 74 of Fig. 4, it is sometimes advantageous to supply separate sliding friction means to insure steady motion of the tape past the playback and recording heads of the recorder. In the embodiment of Fig. 7 such a frictional drag is provided by two sliders 96 and 98 which are mounted on the front panel of the recorder so as to bear resiliently against the tape on either side thereof. The slider 96 may be rigidly mounted along the path of tape travel between the point of emergence from the magazine and the playback head 22, and the slider 98 may be arranged to bear against the tape riding on the slider 96 by means of springs 99. Such separate frictional drag means are not indispensable however.

The magazine of the present invention is readily adaptable to a method of operation in which the central roller is positively driven by an external driving source. The magazines of Figs. 4–7 are readily modified for this purpose by providing a driven shaft affixed to the central roller and coaxial therewith, extending to the rear of the rear end plate of the magazine for engagement by conventional means such as a dog clutch with a drive shaft arranged in the recorder.

In such case the pressure element, whether of the sliding or rolling type which bears on the groove of the central roller, extracts the tape from the magazine at the central aperture. From there the tape passes over recording and playback heads and appropriate idler pulleys on the recorder before being returned to the outer coil of the spiral in the magazine. The external driving roller may be retained in order to maintain the tape under tension as it passes over the sound heads. The behavior of the tape within the magazine, i.e. at points on its path of travel behind the point of contact between the central roller and the friction shoe, may in other respects be identical with that of the embodiment described in connection with Figs. 4–6. This follows because pressure between the pressure element and the tape in the groove of the central roller fulfills the essential condition of preventing slippage between the tape and the groove so that the peripheral speed of the groove on the driven central roller is imparted to the tape.

The elements of the present invention may be conveniently embodied in detachable and portable units, forming magazines and cartridges of tape adapted to be removably associated with appropriate sound record equipment, whether for recording or reproducing or both. The invention may however be permanently built into such equipment. Or the elements may be separable for example with the central roller permanently mounted on the chassis of a recorder, and the tape enclosing structure adapted to be removably associated therewith.

While I have described a particular embodiment of my invention it is to be understood that variations and modifications in the elements of the embodiment shown may be made without departing from the scope of the invention. All such variations and modifications are intended to be included within the appended claims.

I claim:

1. A cartridge of magnetizable record tape mounted in a magazine, said cartridge comprising a container having two end faces, means disposed about the periphery of the end faces adapted to maintain the same in spaced relationship at a separation adapted to accommodate the width of the tape, a roller having a flange and a groove displaced axially of the roller from the flange, the groove being of smaller diameter than the flange, the roller being mounted for rotation relative to the end faces about an axis substantially perpendicular to the same and with the flange between the same, a pressure element arranged on one of the end faces and adapted to bear resiliently against the groove of the roller, an endless tape formed into a spiral having a given number of turns and a loop joining the inner and outer turns of the spiral, the spiral being disposed between the end faces of the container substantially coaxially about the flange of the roller, and the loop being led from the inner turn of the spiral on the flange of the roller into the groove of the roller, under the pressure element and back to the outer turn of the spiral between the end faces of the container at the periphery thereof.

2. A cartridge of magnetizable record tape mounted in a magazine, said cartridge comprising an endless loop of tape formed into a spiral having a given number of turns and an external loop joining the inner and outer turns of the spiral, a container for the tape having two end faces, means disposed about the periphery of the end faces adapted to maintain the same in spaced relation at a separation adapted to accommodate the width of the tape, an aperture in one of the end faces, a roller having a flange and an adjacent groove coaxial with the flange but of smaller diameter than the flange, the roller being mounted for rotation about an axis substantially perpendicular to the end faces with the flange thereof between the end faces and with the groove thereof exterior to the container, a pressure element arranged on the apertured end face of the container and adapted to bear resiliently against the groove of the roller, the spiral of tape being disposed within the container between the end faces thereof substantially coaxially about the flange of the roller, and the external loop of the tape being led from the inner turn of the spiral on the flange of the roller out of the container through the aperture into the groove of the roller, under the pressure element and back to the outer turn of the spiral between the end faces of the container at the periphery thereof.

3. A cartridge of magnetizable record tape mounted in a magazine, said cartridge comprising an endless loop of tape formed into a spiral having a given number of turns and an external loop joining the inner and outer turns of the spiral, a container for the tape having two end faces, means disposed about the periphery of the end faces adapted to maintain the same in spaced relation at a separation at least as large as the width of the tape, a central roller having a flange and an adjacent groove coaxial with the flange but of smaller diameter than the flange, the central roller being mounted for rotation about an axis substantially perpendicular to the end faces with the flange thereof between the end faces and with the groove thereof exterior to the container, two guiding rollers extending at least from the flange of the central roller outwardly toward the periphery of the end faces, a pressure element arranged on one of the end faces of the container and adapted to bear resiliently against the groove of the roller at a position circumferentially displaced from the position of the guiding rollers, the spiral being disposed within the container substantially coaxially about the flange of the central roller with the turns thereof passing between the guiding rollers, the external loop of the tape being led from the inner turn of the spiral on the flange of the central roller into the groove of the central roller, under the pressure element and back to the outer turn of the spiral between the end faces of the container at the periphery thereof.

4. In sound record equipment employing as record medium an endless loop of magnetizable tape adapted to be advanced past a sound head, tape-supporting means comprising a central roller having a flange and a cylindrical groove displaced axially of the central roller from the flange, the groove being of smaller diameter than the flange and of a width adapted to accommodate the tape, two tape-guiding rollers extending radially outwardly of the central roller from positions radially inside the flange of the central roller on either side of the flange, and a pressure element mounted to bear resiliently against the groove in the central roller at a position thereon circumferentially displaced from the bearing of the tape-guiding rollers.

5. In sound record equipment employing as record medium an endless loop of magnetizable tape adapted to be advanced past a sound head, a magazine for said tape comprising a roller having a flange and a cylindrical groove displaced axially of the roller from the flange, the groove being of smaller diameter than the flange and of a width adapted to accommodate the tape, two plates of larger diameter than said flange, said plates being disposed substantially perpendicularly to the axis of the roller, one on either side of the flange thereof, one of said plates being centrally apertured to accommodate the groove, means disposed peripherally of the plates adapted to maintain the same in substantially parallel spaced relation at a separation adapted to accommodate the width of the tape, and a pressure element arranged on the apertured end plate to bear resiliently on the groove of the roller.

6. In sound record equipment employing as record medium an endless loop of magnetizable tape adapted to be advanced past playback and recording equipment, a magazine for said tape comprising a partially enclosed shallow cylindrical box, a central roller mounted coaxially with the cylindrical box for rotation relative thereto, the central roller having a flange within the box and a cylindrical portion axially displaced from the flange, the axially displaced portion being of smaller diameter than the flange and of a width adapted to accommodate the width of the tape, two guiding rollers mounted on the box for rotation about spaced axes extending generally radially of the cylindrical box, the space between the guiding rollers lying intermediate the planes bounding the cylindrical volume of the box and accommodating the width of the tape, and a pressure element mounted on the box in position to bear resiliently on the axially displaced portion of the central roller at a position thereon circumferentially displaced from the bearing of the tape-guiding rollers.

7. In sound record equipment employing as record medium an endless loop of magnetizable tape adapted to be advanced past a sound head, a magazine for said tape comprising a box of substantially circularly cylindrical shape having an altitude between the parallel end faces thereof sufficient to accommodate the width of the tape, a central aperture in one of the end faces of the box coaxial with the cylinder, a central roller mounted coaxially within the box for rotation relative thereto, the central roller having a flange lying between the end faces of the box, a groove on the central roller axially displaced from the flange and protruding through the said central aperture, the groove being of smaller diameter than the diameter of the flange within the box, two guiding rollers mounted on the box for independent rotation about axes extending generally radially of the box, the clearance between the guiding rollers lying within the box and being adapted to accommodate the width of the recording tape, the guiding rollers being mounted on axles supported from the faces of the box at the periphery thereof and extending toward the axis of the cylinder at least to the flange of the central roller, a pressure element pivotally mounted on the apertured end face of the box and adapted to be resiliently stressed against the groove of the central roller exterior to the box at a circumferential position of the central roller displaced from the position of the guiding rollers, and one or more tape guiding tabs arranged on said end faces and extending substantially parallel to the axis of the cylinder for guidance of the inner coil of the spiral between the radial rollers and pressure element.

8. In sound record equipment for use with an endless tape record medium coiled in spiral form with a loop portion to be advanced past a sound head, the combination which comprises a central roller mounted for rotation about its axis, the central roller having a flange and a cylindrical groove of smaller diameter than the flange and axially displaced therefrom, the groove having a width adapted to accommodate the tape, the flange being adapted to accommodate a tape record medium in spiral form therearound and the groove being adapted to receive the tape as it emerges from the inner coil of the spiral, a pair of guiding rollers extending outwardly from the central roller on either side of the flange thereof and positioned to guide a tape therebetween in a spiral about the flange of the central roller, and a pressure element mounted to bear resiliently against the groove in the central roller at a position thereon circumferentially displaced from the bearing of the tape-guiding rollers, whereby the emerging portion of said tape will be held in engagement with the groove.

9. In sound record equipment employing an endless tape record medium coiled in spiral form with an external loop portion joining the inner and outer turns of the spiral, the combination which comprises a roller mounted for rotation about its axis, a flange on the central roller adapted to accommodate the spiral of tape therearound with the inner turn of the spiral on the flange, a cylindrical groove on the central roller of smaller diameter than the flange, the groove having a width substantially equal to the width of the tape whereby the groove is adapted to receive the loop of tape emerging from the inner coil of the spiral, guiding means disposed on either side of the flange adapted to maintain the tape exclusive of the external loop in a flat spiral disposed coaxially about the flange of the roller, and a pressure element mounted to bear resiliently against the emerging portion of the tape lying in the groove, and adapted to prevent slippage between the tape and the groove.

10. In sound record equipment employing as record medium an endless loop of magnetizable tape coiled in spiral form adapted to be advanced past a sound head, a magazine comprising a central roller mounted for rotation about its own axis, a flange on the central roller, a groove on the central roller of smaller diameter than the flange, the groove being displaced axially of the roller from the position of the flange, two guiding rollers extending outwardly from the central roller on either side of the flange thereof and adapted to maintain the spiral of tape coaxially displosed about the flange of the central roller with the inner coil of the spiral on the flange, a pressure element mounted to bear resiliently against the groove in the central roller at a peripheral position of the central roller circumferentially displaced from the position of the guiding rollers, and tape guiding means extending substantially parallel to the axis of rotation of the central roller at a position radially outside the groove of the central roller and circumferentially between the guiding rollers and the pressure element, said tape guiding means being adapted to maintain the inner coil of the spiral of tape out of contact with the flange over a substantial portion of the arc thereof between the guiding rollers and the pressure element.

11. In sound record equipment employing as record medium an endless loop of magnetizable tape coiled in spiral form adapted to be advanced past a sound head, a magazine comprising a central roller mounted for rotation about its own axis, a flange on the central roller, a groove on the central roller of smaller diameter than the flange, the groove being displaced axially of the roller from the position of the flange, two guiding rollers extending outwardly from the central roller on either side of the flange thereof and adapted to maintain the spiral of tape coaxially disposed about the flange of the central roller with the inner coil of the spiral on the flange, a pressure element mounted to bear resiliently against the groove in the central roller at a peripheral position of the central roller circumferentially displaced from the position of the guiding rollers, and tape guiding means extending substantially parallel to the axis of rotation of the central roller at a position radially outside the groove of the central roller and circumferentially between the guiding rollers and the pressure element, said tape guilding means being adapted to pass between the inner coil of the spiral and the adjacent coil to retard the growth of slack in the inner coil between the guiding rollers and the pressure element.

12. In sound record equipment employing as record medium an endless loop of magnetizable tape coiled in spiral form adapted to be advanced past a sound head, a magazine comprising a central roller mounted for rotation about its own axis, a flange on the central roller, a groove on the central roller of smaller diameter than the flange, the groove being displaced axially of the roller from the position of the flange, two guiding rollers extending outwardly from the central roller on either side of the flange thereof and adapted to maintain the spiral of tape coaxially disposed about the flange of the central roller with the inner coil of the spiral on the flange, a pressure element mounted to bear resiliently against the groove in the central roller at a peripheral position of the central roller circumferentially displaced from the position of the guiding rollers, a plurality of tape guiding means extending substantially parallel to the axis of rotation of the central roller at positions radially outside the groove of the central roller and circumferentially between the guiding rollers and the pressure element, one of said tape guiding means being adapted to maintain the inner coil of the spiral of tape out of contact with the flange over a substantial portion of the arc thereof between the guiding rollers and the pressure element and another of the said guiding means being adapted to pass between the inner coil of the spiral and the adjacent coil to retard the growth of slack in the inner coil between the guiding rollers and the pressure element.

References Cited in the file of this patent

UNITED STATES PATENTS

| | | |
|---|---|---|
| 1,491,575 | Wilson | Apr. 22, 1924 |
| 2,281,328 | Shapiro | Apr. 28, 1942 |
| 2,307,806 | Schnoor | Jan. 17, 1947 |

FOREIGN PATENTS

| | | |
|---|---|---|
| 406,868 | Great Britain | Mar. 8, 1934 |
| 496,974 | Great Britain | Dec. 9, 1938 |
| 112,599 | Australia | Mar. 6, 1941 |
| 117,575 | Australia | Oct. 14, 1943 |